UNITED STATES PATENT OFFICE.

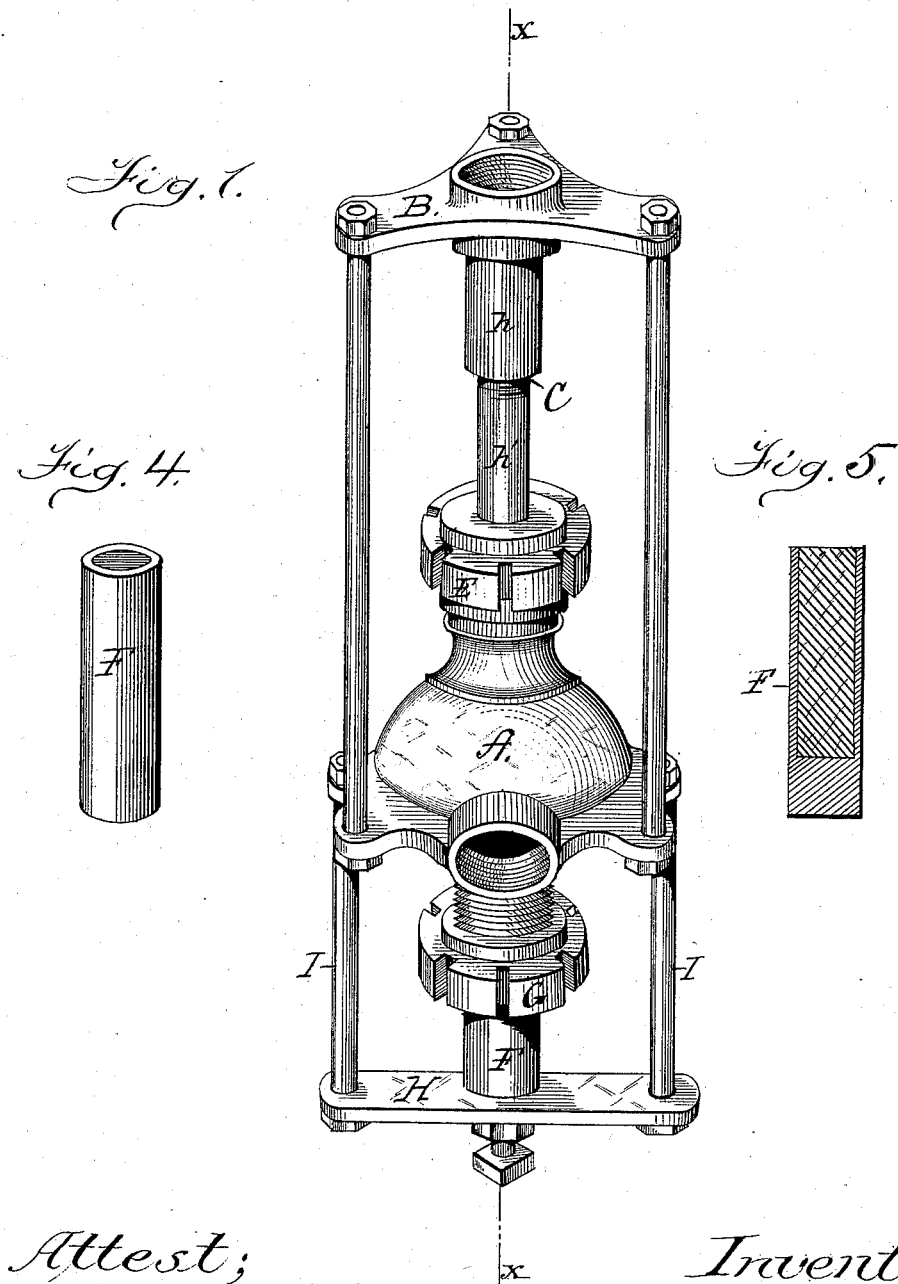

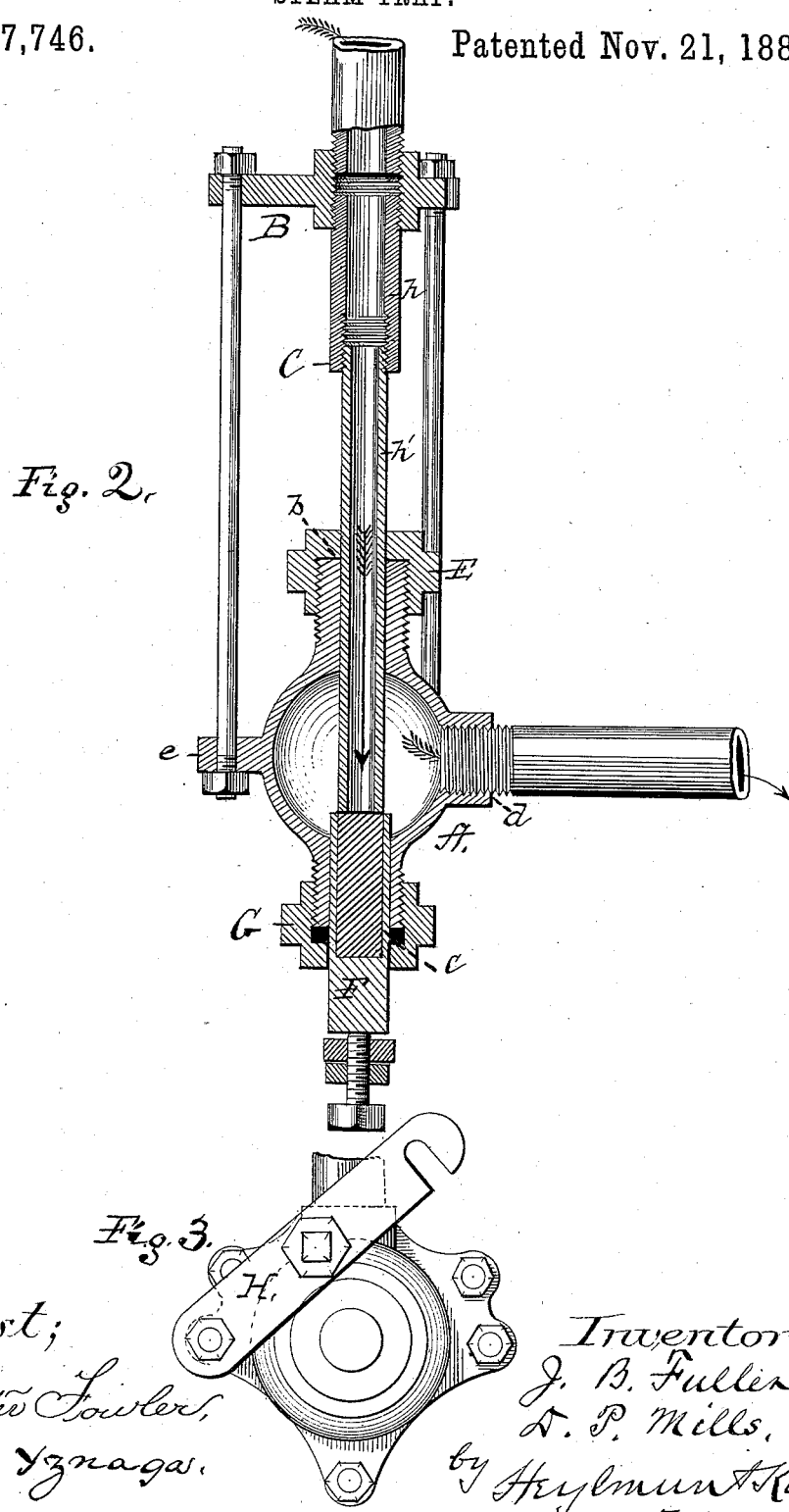

JEROME B. FULLER AND DWIGHT P. MILLS, OF NAUGATUCK, CONNECTICUT.

STEAM-TRAP.

SPECIFICATION forming part of Letters Patent No. 267,746, dated November 21, 1882.

Application filed August 31, 1882. (Model.)

*To all whom it may concern:*

Be it known that we, JEROME B. FULLER and DWIGHT P. MILLS, citizens of the United States of America, residing at Naugatuck, in the county of New Haven and State of Connecticut, have invented certain new and useful Improvements in Steam-Traps; and we do hereby declare the following to be a full, clear, and exact description of the invention, such as will enable others skilled in the art to which it appertains to make and use the same.

This invention relates to steam-traps employed in connection with steam-pipes for heating buildings and other structures, and belongs to that class in which the expansion or contraction of a steam-pipe opens and closes the vent between the end of the steam-pipe and the valve-seat.

Our improvement consists in the novel construction and combination of parts, as will be hereinafter more fully set forth and specifically claimed.

Figure 1 represents a perspective view of our improved steam-trap. Fig. 2 is a sectional view through the line $x\,x$ of Fig. 1. Fig. 3 is a bottom view of the same, and Figs. 4 and 5 are detail views.

In the annexed drawings, forming a part of this specification, the letter A represents a globe with the top opening, $b$, lower opening, $c$, and side discharge-opening, $d$. This, constituting the valve-chamber, is also formed with an exterior central flange, $e$, affording means for attaching the supporting-rods and yoke-bars. To the upper ends of the supporting-rods is attached a triangular-shaped plate, B, with a central screw-threaded opening for the passage and connection of the sectional expansion-pipe C. This expansion-pipe C is made in two parts or sections of different diameters. The upper section, $h$, is preferably made of pipe-metal, and provided with outside screw-threads on the upper end for connection with the triangular plate B; and the lower section, $h'$, is preferably made of copper, the two sections being connected by screw-threads or suitable coupling. The lower end of the lower expansion-pipe section is made square, so as to secure a good bearing-surface against the valve-face; and a steam-tight joint is obtained by the stuffing-washer E engaging with the screw-threads on the extension of the induction-opening $b$, as shown.

Through the lower opening, $c$, of the globe is inserted a rod or plug, F, in line with the expansion-pipe, to co-operate therewith in the manner hereinafter stated. A steam-tight joint is made around this rod by the screw-threaded stuffing-washer G engaging with the screw-thread on the extension of the lower opening in the globe. This rod or plug F is sustained in position by the yoke or cross-bar H, mounted on the rods or bars I. One end of the cross-bar H is slotted crosswise to enable it to be swung to one side for the insertion and removal of the rod or plug. This cross-bar is provided with a set-screw and jam-nut centrally arranged to fit over the rod F, located in the globe. The triangular-shaped plate, to which one end of the expansion-pipe and the rods are secured, is firmly connected to the end of pipes to be drained, and steam let on. When the steam is admitted, adjust the movable rod or plug F through the agency of the set-screw in the cross-bar until the escape of steam is stopped, and fix the set-screw by the jam or lock nut.

In the operation, whenever water of condensation forms in the expansion-pipe, it causes the pipe to contract until an opening or vent is formed between the end of expansion-pipe and valve-seat, which action allows the water to escape, and the steam following causes the pipe to expand, thereby closing the outlet just before the steam reaches it, thus obviating a waste of steam.

By the foregoing-described construction and organization the lower section of the expansion-pipe and the plug with valve-seat can be readily and easily removed for repairs or renewal, in case they are worn by the action of steam and water.

It will be observed that by making the expansion-pipe of two sections of different diameter we attain strength and stiffness by the section of larger diameter, preventing it from springing by the pressure of expansion, and by having the lower section the smaller we attain sensitiveness in expansion and contraction, and yet have sufficient escape to discharge the accumulated water from a large number of heating-pipes, and also obtain a perfect joint on the valve-seat. It is also easier to keep the trap in repair.

What we claim as our invention, and desire to secure by Letters Patent, is—

1. In a steam-trap, the expansion-pipe composed of two parts connected at their middle or meeting ends, but of different diameters and sensitiveness of heat, substantially as and for the purposes set forth.

2. In a steam-trap, the combination, with an expansion-pipe and a plug with a valve-seat, of a cross-bar or yoke provided with a set-screw and a jam-nut, and constructed at one end with a cross-slot and the other end working on an axis, whereby the cross-bar is capable of swinging to one side to allow the removal of the movable plug and lower end of expansion-pipe, substantially as described.

3. The improved steam-trap, consisting of the globe with the inlet and outlets, and provided with central flange, $e$, plate B, with central screw-threaded opening, connecting-rods, the expansion-pipe C, composed of two sections made of different metals, the plug F, and the cross-bar H, with set-screw and jam-nut, substantially as described.

In testimony whereof we affix our signatures in presence of two witnesses.

J. B. FULLER.
DWIGHT P. MILLS.

Witnesses:
HENRY C. BALDWIN,
ALONZO J. WOOD.